Jan. 26, 1965     J. W. GRAY ETAL     3,167,698
AUTOPILOT EMPLOYING EARTH INDUCTOR COMPASS
Filed Aug. 15, 1961     2 Sheets-Sheet 2

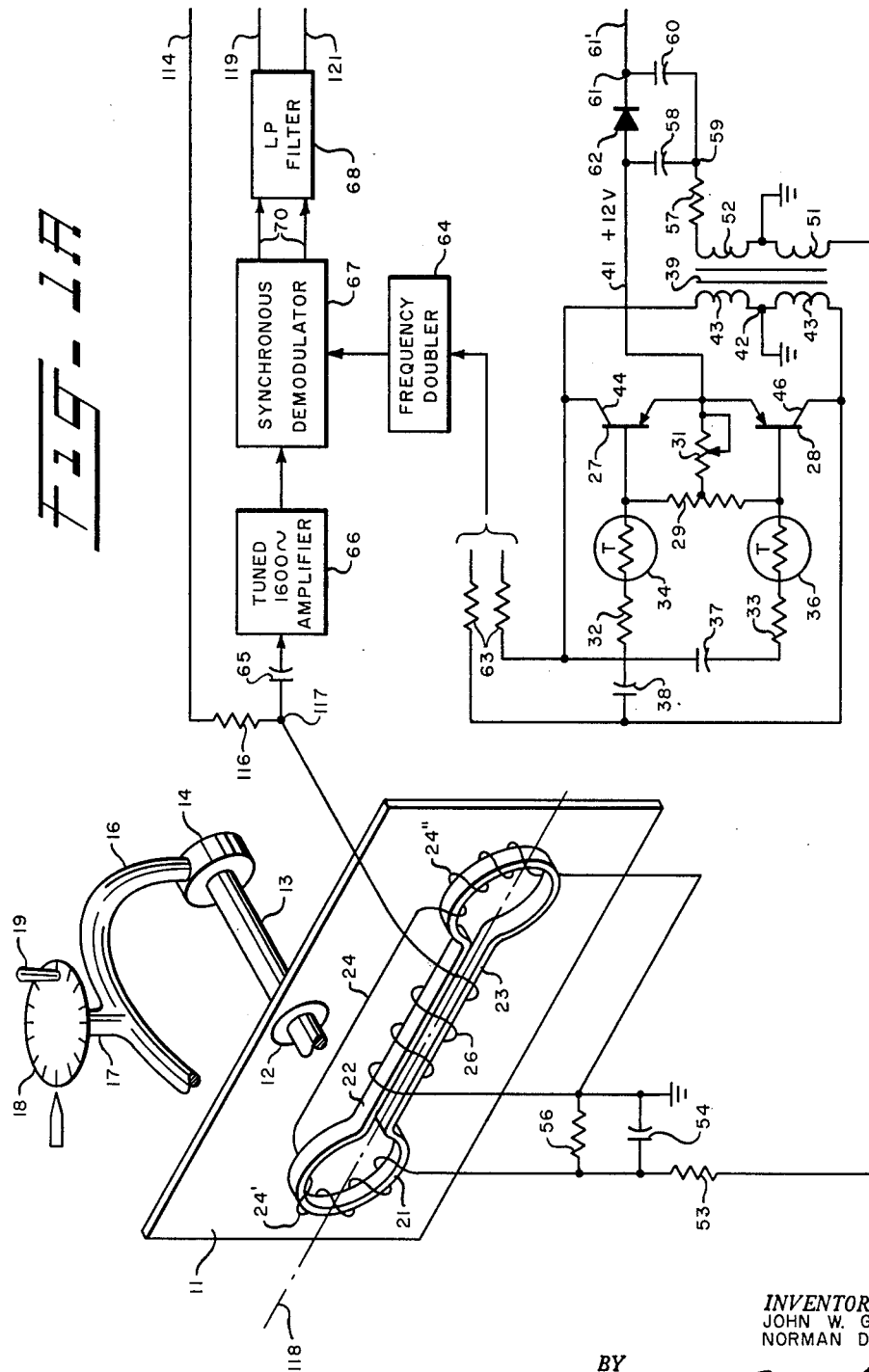

*INVENTOR.*
JOHN W. GRAY
NORMAN DUBOIS
BY
*H. I. Mackey*
ATTORNEY.

United States Patent Office

3,167,698
Patented Jan. 26, 1965

3,167,698
AUTOPILOT EMPLOYING EARTH
INDUCTOR COMPASS
John W. Gray, Pleasantville, and Norman L. Du Bois, Thornwood, N.Y., assignors to General Precision, Inc., a corporation of Delaware
Filed Aug. 15, 1961, Ser. No. 131,592
18 Claims. (Cl. 318—28)

This invention relates to automatic pilot systems and particularly to systems suitable for small craft.

An object of this invention is to provide a simple autopilot for steering an aircraft, small boat, or other navigable vehicle.

Another object is to provide an autopilot employing an earth inductor compass to sense the direction of magnetic north.

Another object is to provide an autopilot employing electrical negative feedback for proportional control of the autopilot steering function.

The system of this invention employs as sensing element a single-phase earth inductor compass. It is energized at a selected frequency of alternating current and emits a signal at double the selected frequency having a phase sense representing the sense of the pointing error relative to the magnetic north direction. This signal is amplified and synchronously demodulated to secure a direct current having a polarity representing the phase sense of the alternating signal applied to it. The direct current signal is amplified in a transistor amplifier emitting pulses having a width representative of input signal amplitude, then is applied to a motor. This motor is connected to turn the rudder of the boat on which the system is mounted.

The motor also positions a potentiometer which applies current to a winding of the earth inductor compass, magnetizing the core of the compass in such direction as to tend to neutralize the magnetism induced in the core by the horizontal component of the earth's magnetic field. This potentiometer current thus serves as a proportional negative feedback. The current strength, being proportional to the rudder deflection, stabilizes the system, preventing hunting.

Figure 1B:
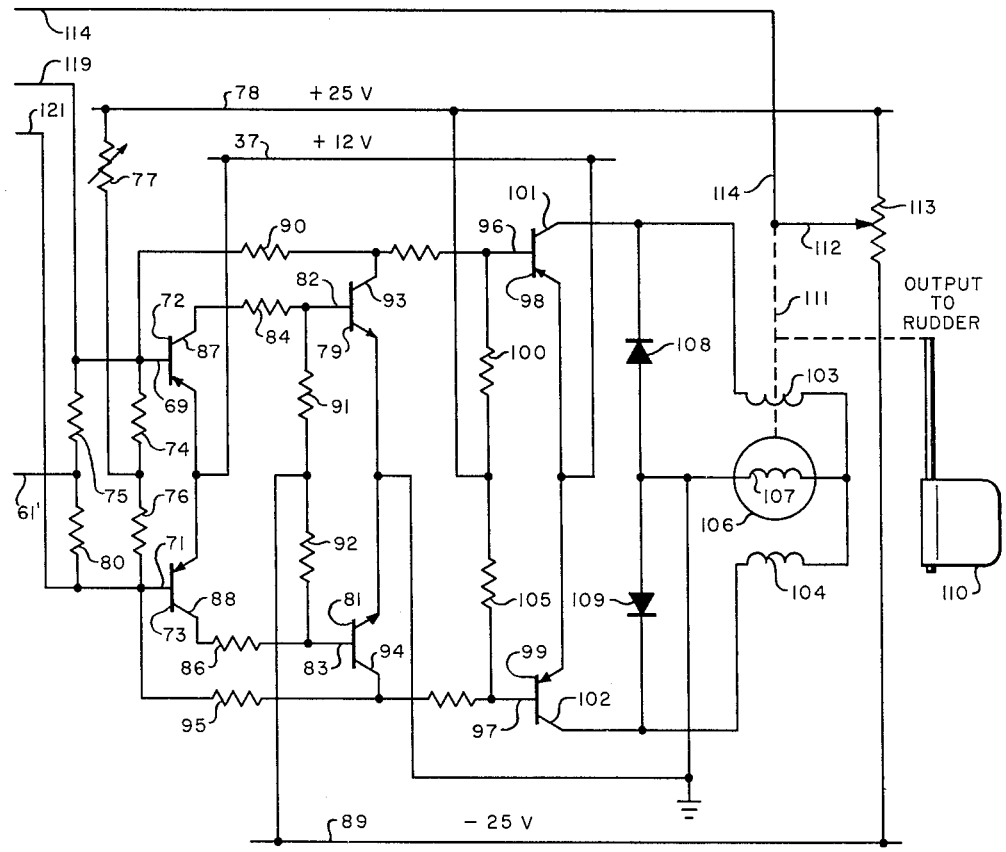

Further understanding of this invention may be secured from the detailed description and drawings, in which:

FIGURES 1A and 1B taken together constitute the schematic circuit of an embodiment of the invention.

Figure 2:
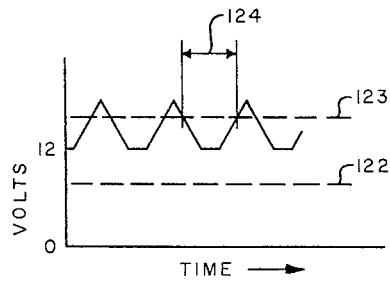

FIGURE 2 is a graph illustrating operation of a part of the system.

Referring now to FIGURE 1A, a sensing element comprises a nonmagnetic plate 11 which is supported pendulously and vertically by a shaft 13. The shaft 13 is gimbaled in two bearings, one of which, 14, is shown. The two bearings are supported by a yoke 16 and rotatable vertical shaft 17 bearing a compass card 18 and adjusting handle 19. The plate 11 supports a magnetic structure having a laminated iron core 21 formed in the shape of a dumbbell. The iron of core 21 is preferably of a type which has a low saturating value and has a steeply sloping magnetization characteristic. The two straight portions of the core, 22 and 23, are parallel and adjacent each other but separated by a gap, preferably filled with a nonmagnetic material for mechanical support. The end lobes of the core 21 are wound with two energizing coils of fine wire, 24' and 24", which, when considered as a single entity, constitute an energizing coil 24. A sensing coil, 26, is wound about both of the straight portions, 22 and 23, of the core.

An 800 c.p.s., square-wave oscillator comprises two transistors 27 and 28, center-tapped resistor 29, rheostat 31, two similar resistors 32 and 33, two thermistors 34 and 36, and two similar capacitors 37 and 38. It also includes the transformer 39. Power is drawn from the 12-volt bus 41, with return to ground at the midtap 42 of the winding 43 of transformer 39.

In the operation of this push-pull oscillator, its frequency is determined by the capacitors 37 and 38, the resistance of the resistor 32 in series with that of the thermistor 34, and the resistance of the resistor 33 in series with that of the thermistor 36. The oscillator frequency is independent of ambient temperature changes.

The oscillator output coil 51 is connected through a resistor 53 to one end of the energizing coil 24, the other end of which is grounded. A capacitor 54 and resistor 56 are connected across the coil 24. The integrating effect of the capacitor 54 causes the waveform applied to the energizing coil 24 to be intermediate between a square shape and a triangular shape. The resistors 53 and 56 stabilize the circuit by preventing sharp resonance or any close approach to that condition.

The oscillator output coil 52 is connected through a series resistor 57 and shunt capacitor 58 to junction 59, converting the rectangular wave shape to a triangular wave shape by the integrating effect of the network. The signal is A.-C. coupled by capacitor 60 from junction 59 to junction 61, which is connected through a diode 62 to the +12-volt bus 37. This diode serves as a D.-C. restorer. Under zero load the triangular waveform is elevated by this restorer to a minimum of +12 volts, neglecting diode drop. Under load, the lower end of the waveform is truncated, as shown in FIGURE 2.

The oscillator collectors 44 and 46 are connected through resistors 63 to a frequency doubler 64 having a 1600 c.p.s. output.

The sensing coil 26 of the sensing element is grounded at one end and is A.-C. coupled at the other end through a capacitor 65 to an amplifier 66 tuned to 1600 c.p.s., with a bandwidth of about 200 c.p.s. The amplifier output is connected to the input of a phase detector or synchronous demodulator 67 having push-pull output at conductors 70. This demodulator also receives the 1600 c.p.s. output of the frequency doubler 64, so that its difference frequency output is direct current having a polarity representing the phase sense of the signal from the amplifier 66.

The demodulated output is applied, through a low-pass filter 68, which removes any residual alternating current components, and through conductors 119 and 121, FIGURES 1A and 1B, to the base input terminals 69 and 71, FIGURE 1B, of the first stage of a three-stage high-gain pulse-width modulation amplifier. This first stage comprises transistors 72 and 73 connected as common-emitter amplifiers. Direct-current bias is applied through resistors 74 and 76 and a rheostat 77, for adjusting dead time, from a +25-volt bus 78. The truncated triangular waveform existing at junction 61, FIGURE 1A, is additionally applied, through conductor 61' and resistors 75 and 80, FIGURE 1B, to the bases 69 and 71.

The second stage comprises transistors 79 and 81 connected as common-emitter amplifiers. Their bases 82 and 83 are connected through resistors 84 and 86 to the first-stage collectors 87 and 88. Negative bias is applied to the bases 82 and 83 from a minus 25-volt bus 89 through resistors 91 and 92. The collectors 93 and 94 of the second stage are connected to the bases 96 and 97 of the third stage comprising transistors 98 and 99 connected as common-emitter amplifiers. Positive feedback from the second to first stage is provided by connecting collector 93 through resistor 90 to base 69, and connecting collector 94 through resistor 95 to base 71. Third stage base bias is provided through resistors 100 and 105 from the +25-volt bus 78. The third stage collectors 101 and 102 are connected to the series fields 103 and 104 of a small split-series-field motor 106. The motor armature winding 107 is grounded at one end and connected to the fields at the other. Two diodes, 108 and 109, are connected between the collectors 101 and 102 and ground. These diodes protect the transistors from injury by inductive discharge of the motor fields when the transistors are suddenly made nonconductive.

The shaft 111 of motor 106 turns the rudder 110 of the boat and its angular deflection constitutes the output of the autopilot. The motion of the shaft 111 is also fed back as a proportional negative or degenerative electrical signal. This is done by connecting the shaft 111 to the slider 112 of a potentiometer 113. The potentiometer terminals are connected to the +25 and −25 buses, and the slider 112 is connected through a conductor 114 and resistor 116, FIGURE 1A, to the terminal 117 of the sensing coil 26.

In the operation of the circuit of FIGURES 1A and 1B, the single-phase earth inductor compass is hung by means of the shaft 13 from the antifriction bearings 14 so that the longitudinal axis 118 will remain substantially horizontal in spite of rolling and pitching of the craft carrying the system. This bearing system thus constitutes a simple gimbal support. It is not necessary to maintain the shorter dimension of the card 11 vertical since departure from vertical in this direction introduces no error.

Let it be supposed that the earth inductor compass graduated card 18, FIGURE 1A, and the associated magnetic structure on plate 11, be turned so that the left end of the horizontal axis 118 points to the north. The 800 c.p.s. current applied to the energizing coil 24 is strong enough so that, over most of its cycle, the iron core 21 is saturated and thus has very low permeability. The weak horizontal component of the earth's field therefore is not disturbed by the iron and traverses the core only to a very minor degree. However, when the 800 c.p.s. current passes through zero, twice in each cycle, the core permeability becomes high. The lines of the earth's magnetic field at these times are concentrated by the core and are bent to traverse the parallel legs 22 and 23, then again leave the core as the energizing current in coil 24 builds up in the opposite direction. These changes of the unidirectional earth's field flux through the core generate a double-frequency alternating potential in the sensing coil 26. Were the earth's field to be reversed in direction the phase of this double-frequency potential would be reversed. That is, by rotating the card 18 or by shifting the boat so that the north direction rotates toward a position nearly perpendicular to the axis 118 of card 11, and by then continuing the rotation through the position of perpendicularity, the phase of the double-frequency potential reverses.

The sensing coil 26 is coupled through the low impedance capacitor 65 to the amplifier 66 tuned to the double frequency of 1600 c.p.s. Little energy is lost through the relatively high impedance resistor 116. The signal, after amplification, is mixed in the demodulator 67 with a potential obtained from the frequency doubler 64 having the same frequency of 1600 c.p.s. and the same or opposite phase. The demodulation difference product in conductors 70 consists of direct current having a polarity representing the phase of the sensing coil output. This current is passed through the low-pass filter 68 to remove the sum sideband and noise and to smooth the output.

In the operation of the pulse width amplifier comprising transistors 72, 73, 79, 81, 98 and 99, the signal obtained from filter 68 is imposed on the pair of conductors 119 and 121, which are at any instant of opposite polarity. All six transistors are substantially nonconductive in the absence of any signal from conductor 119 and 121, all six bases being biased beyond the emitter potentials by the fixed biases applied to them. The first stage is so adjusted by resistor 77 that in the absence of an input signal its base biases are very slightly more positive than the emitters at the times of the truncated parts of the waveform FIGURE 2. At other times the triangular parts of the waveforms make the bases 69 and 71 decidedly more positive than the emitters. At all times, however, base currents into transistors 71 and 72 are entirely cut off in absence of an input signal on conductors 119 and 121.

When a small input signal is applied, consisting of equal direct potentials from conductors 119 and 121 of opposite polarities, the positive potential causes its transistor to be still further back biased and to remain nonconductive. The negative potential input, however, overcomes, during the truncated parts shown in FIGURE 2, the slight positive back bias and the transistor becomes partly conducting. Assume this is transistor 72. This causes the second and third stage transistors 79 and 98 to become conducting and, aided by the positive feedback through resistor 90, the three transistors 72, 79 and 98 become fully conducting. This causes maximum current to flow in the motor field 103. However, this occurs only during each truncated part of the graph of FIGURE 2. This truncated part is only so much of the complete cycle as to overcome sticking and static friction of the motor 106. During the remainder of each cycle the back bias on both transistors 72 and 73 is increased up to several volts by the bias waveform of FIGURE 2, overcoming the small input signal and restoring the nonconductivity of the transistor 72. Thus the motor field 103 is energized for only a fraction of each cycle of the 800 c.p.s. current corresponding to the ratio of the time of a truncation to the period of one cycle.

Upon increasing the negative input signal to an amount resulting in the less positive value 122, FIGURE 2, applied to the base 69, a larger positive bias, as shown at 123 is called for to overcome this signal and to restore the nonconductivity of transistor 72. The motor now receives current during the time 124, which is greater than the time of one truncation. Therefore the motor speed and torque are controlled by the widths of the pulses applied to it 800 times a second.

One advantage of this mode of amplifier operation is that all six transistors are always either fully conducting or fully nonconducting. In either case resistive losses within the transistors are held to minimum, with minimum heating and, consequently, relatively high power output capacity.

The direction of motor rotation is such that it moves the rudder to steer the boat so that the face of the plate 11, FIGURE 1A, tends to become perpendicular to the north direction. When the plate 11 is exactly perpendicular to north direction the compass card 18 indicates heading. When the axis 118 of plate 11 is not perpendicular to the north direction the departure from perpendicularity is the heading error.

In the absence of proportional negative feedback control, the signal applied from coil 26 to the amplifier is proportional to the sine of the heading error, and the speed of motor 106 is proportional to this signal. The design is such, however, that the amplifiers saturate at a very small heading error, say a few degrees. Therefore, in the absence of feedback the motor would often be at maximum speed and even a small steering error may cause the rudder to go hard over to its maximum angle. This would cause the craft to proceed by a sinuous course oscillating about the course set on card 18.

The feedback from the rudder 110 through potentiometer slider 112, conductor 114 and resistor 116 provides the required steering stability and prevents the craft from taking this sinuous path. This feedback applies a direct current in coil 26 which in turn produces a magnetic flux having such direction as to oppose the earth's flux through the coil, and consequently reduces the steering error signal by an amount which is proportional to the rudder deflection. The practical result is that steering error is progressively reduced in such a manner that the craft's heading approaches the desired course exponentially, instead of oscillating or hunting about the desired course direction.

It is to be noted that the coil 26 has two distinct functions. It is a sensing coil emitting a 1600 c.p.s. heading error signal, and it also carries a negative feedback direct current which generates flux partly opposing the earth's flux during those times when the earth's flux passes through the straight core sections 23.

What is claimed is:

1. An autopilot for a craft comprising, an earth inductor compass including a sensing coil, means exciting said compass whereby an output signal is generated thereby, means demodulating said output signal, means amplifying said demodulated output signal, a motor energized by said amplified signal deflecting a rudder located on said craft, and negative feedback means applying a signal the magnitude of which is representative of the amount of deflection of said rudder to said sensing coil in a direction such as to generate a magnetic flux opposing the earth's flux passing through said inductor compass.

2. An autopilot comprising, an oscillator generating an output having a preselected frequency, an earth inductor compass excited thereby and having a sensing coil emitting a signal having double said preselected frequency, means demodulating said signal and producing a direct current therefrom, direct-coupled amplifier means, alternating current means biasing said amplifier to cut off, said direct-coupled amplifier having said direct current imposed thereon and producing an amplified pulse output therefrom, a motor operated thereby, said motor controlling the deflection of a rudder, and negative feedback means operated by said motor applying a signal the magnitude of which is representative of the amount of deflection of said rudder to said sensing coil in a direction such as to generate a magnetic flux opposing the earth's flux passing through said inductor compass.

3. An autopilot comprising, an earth inductor compass including a sensing coil, means energized by the output thereof for producing a pair of direct current signals of opposite senses whose magnitudes depend on the magnitude of said compass output and the respective sense of which is dependent on the orientation of said compass relative to a datum direction, means for converting that one of said pair of direct current signals which has a selected sense into a train of pulse signals the width of which depends on the magnitude of the direct current signal having said selected sense whereby one or the other of a pair of pulse train signals is produced corresponding to one or the other of said pair of direct current signals, a motor energized by said pulse train signals in such direction as to be rotated in one direction by one of said pulse train signals and in the opposite direction by the other of said pulse train signals, and negative feedback means operated by said motor applying a feedback signal which is proportional to the amount by which said motor is rotated to said sensing coil in a direction such as to generate a magnetic flux opposing the earth's flux passing through said inductor compass.

4. An autopilot comprising, an earth inductor compass including a sensing coil, means energized by the output thereof for producing a pair of direct current signals of opposite senses whose magnitudes depend on the magnitude of said compass output and the respective sense of which is dependent on the orientation of said compass relative to a datum direction, a dual channel amplifier having one of said direct current signals imposed on one channel and the other direct current signal imposed on the other channel, means including said dual channel amplifier for converting that one of said pair of direct current signals which has a selected sense relative to a datum into a train of pulse signals the width of which depends on the magnitude of the direct current signal whereby a train of pulse signals is produced in the output of one of the other of said dual channels, a motor connected to the outputs of each of said amplifier channels and energized in such direction thereby that pulse train signals produced in one amplifier channel rotate said motor in one direction while pulse train signals produced in the other channel rotate the motor in the opposite direction, a rudder operated by said motor, and negative feedback means operated by said rudder applying a feedback signal which is proportional to the deflection of said rudder to said sensing coil in a direction such as to generate a magnetic flux opposing the earth's flux passing through said inductor compass.

5. An autopilot comprising an earth inductor compass, means energized by the output thereof for producing a pair of direct current signals of opposite senses whose magnitudes depend on the magnitude of said compass output and the respective sense of which is dependent on the orientation of said compass relative to a datum direction, a dual channel amplifier having a respective one of said direct current signals impressed on the respective inputs of said dual channels, means for imposing a bias on each of said dual channels biasing them to cutoff in the absence of signal input, means for superposing a periodically varying sloping waveform potential on said bias in such direction as to drive said channels further into the cutoff region, a motor connected to the outputs of each of said amplifier channels and so energized thereby that signal output from one channel drives said motor in one direction whereas signal output produced by the other channel drives said motor in the opposite direction, a rudder actuated by said motor, and negative feedback means actuated in accordance with said rudder deflection applying a feedback signal to said earth inductor compass which is proportional to the deflection of said rudder.

6. An autopilot comprising, an earth inductor compass, means energized by the output thereof for producing a pair of direct current signals of opposite senses whose magnitudes depend on the magnitude of said compass output and the respective sense of which is dependent on the orientation of said compass relative to a datum direction, a dual channel amplifier having a respective one of said direct current signals impressed on the respective inputs of said dual channels, means for imposing a direct current bias on each of said channels of such magnitude as to just render said channels nonconductive, means for generating a triangular waveform, means for superposing said triangular waveform on said direct current bias in such a direction as to drive said channels further into their cutoff region, a motor connected to the outputs of each of said amplifier channels and so energized thereby that signal output from one channel drives said motor in one direction whereas signal output produced by the other channel drives said motor in the opposite direction, a rudder actuated by said motor, and negative feedback means actuated in accordance with said rudder deflection applying a feedback signal to said earth inductor compass which is proportional to the deflection of said rudder.

7. An autopilot comprising, an earth inductor compass, means energized by the output thereof for producing a pair of direct current signals of opposite sense whose magnitudes depend on the magnitude of said compass output and the respective sense of which is dependent on the orientation of said compass relative to a datum direction, a dual channel amplifier having a respective one of said direct current signals impressed on the respective inputs of said dual channels, means for imposing a direct current bias on each of said channels of such magnitude as to just render said channels nonconductive, means for generating a triangular waveform having truncated base apexes, means for superposing said triangular waveform on said direct current bias with the truncated bases at the level of the direct current bias and the remainder of the triangular waveform extending in a direction such as to drive said channels further into their cutoff region, a split series field motor having opposite ends of its split field connected to respective outputs of said dual channels, a rudder actuated by said motor, and negative feedback means actuated in accordance with said rudder deflection applying a feedback signal to said earth inductor compass which is proportional to the deflection of said rudder.

8. An autopilot comprising, an earth inductor compass, means energized by the output thereof for producing a pair of direct current signals of opposite senses whose magnitudes depend on the magnitude of said compass output and the respective sense of which is dependent on the orientation of said compass relative to a datum direction, a dual channel amplifier having a respective one of said direct current signals impressed on the respective inputs of said dual channels, each of said channels being composed of a plurality of stages, means for imposing a direct current bias on each of the stages of such magnitude as to render each stage nonconductive, the magnitude of the direct current bias applied to the first stage of each channel being such as to extend just into the cutoff region, positive feedback means for each of said channels whereby a signal sufficient to overcome the bias of a first stage renders the associated channel fully conductive, means for generating a triangular waveform, means for superposing said triangular waveform on the direct current biases of each of the first stages of said dual channel amplifier in such a direction as to drive said first stages further into their cutoff region, a motor connected to the outputs of each of said amplifier channels and so energized thereby that signal output from one channel drives said motor in one direction whereas signal output produced by the other channel drives said motor in the opposite direction, a rudder actuated by said motor, and negative feedback means actuated in accordance with said rudder deflection applying a feedback signal to said earth inductor compass which is proportional to the deflection of said rudder.

9. An autopilot comprising, an earth inductor compass, means energized by the output thereof for producing a pair of direct current signals of opposite sense whose magnitudes depend on the magnitude of said compass output and the respective sense of which is dependent on the orientation of said compass relative to a datum direction, a dual channel amplifier having a respective one of said direct current signals impressed on the respective inputs of said dual channels, each of said channels being composed of a plurality of stages, means for imposing a direct current bias on each of the stages of such magnitude as to render each stage nonconductive, the magnitude of the direct current bias applied to the front stage of each channel being such as to extend just into the cutoff region, positive feedback means for each of said channels whereby a signal sufficient to overcome the bias of a first stage renders the associated channel fully conductive, means for generating a triangular waveform having truncated base apexes, means for superposing said triangular waveform on the direct current biases of each of the first stages with the truncated bases at the level of the direct current bias and the remainder of the triangular waveform extending in a direction such as to drive said channels further into their cutoff region, a split series field motor having opposite ends of its split field connected to the respective outputs of said dual channels, a rudder actuated by said motor, and negative feedback means actuated in accordance with said rudder deflection applying a feedback signal to said earth inductor compass which is proportional to the deflection of said rudder.

10. An autopilot comprising, an oscillator generating an output having a preselected frequency, an earth inductor compass excited thereby and emitting a steering error signal having double said preselected frequency, a frequency doubler having an output of said oscillator imposed thereon, a synchronous demodulator having the output of said frequency doubler and said steering error signal impressed thereon and producing therefrom a pair of direct current signals of opposite senses the magnitudes of which depend on the magnitude of said steering error signal and the senses of which depend on the phase of said steering error signal relative to the phase of the output signal of said frequency doubler, a dual channel direct coupled amplifier having said direct current signals imposed on respective ones of said channels, means including alternating current means biasing said amplifier to cutoff in the absence of signal impressed thereon, a split series field motor having opposite ends of its split series field connected to respective output channels of said dual channel amplifier, said motor being connected to operate a rudder, and negative feedback means operated by said motor applying a feedback signal to said earth inductor compass which is proportional to the deflection of said rudder.

11. An autopilot comprising, an oscillator generating an output having a preselected frequency, an earth inductor compass excited thereby and emitting a steering error signal having double said preselected frequency, a frequency doubler having an output of said oscillator imposed thereon, a synchronous demodulator having the output of said frequency doubler and said steering error signal impressed thereon and producing therefrom a pair of direct current signals of opposite sense the magnitudes of which depend on the magnitude of said steering error signal and the senses of which depend on the phase of said steering error signal relative to the phase of said frequency doubler output signal, a dual channel amplifier having a respective one of said direct current signals impressed on the respective inputs of said dual channels, means for imposing a direct current bias on each of said channels of such magnitude as to just bring each of said channels into the region of cutoff, means for generating a triangular waveform, means for superposing said triangular waveform on said direct current bias in such a direction as to drive said channels further into their cutoff region, a motor connected to the outputs of each of said amplifier channels and so energized thereby that the signal output from one channel drives said motor in one direction whereas signal output produced by the other channel drives said motor in the opposite direction, a rudder actuated by said motor, and negative feedback means actuated in accordance with said rudder deflection applying a feedback signal to said earth inductor compass which is proportional to the deflection of said rudder.

12. An autopilot as set forth in claim 11 in which the means for generating the triangular waveform is energized by an output of said oscillator.

13. An autopilot comprising, an oscillator generating an output having a preselected frequency, an earth inductor compass excited thereby and emitting a steering error signal having double said preselected frequency, a frequency doubler having an output of said oscillator imposed thereon, a synchronous demodulator having the output of said frequency doubler and said steering error signal impressed thereon and producing therefrom a pair of direct current signals of opposite sense the magnitudes of which depend on the magnitude of said steering error signal and the senses of which depend on the phase of said steering error signal relative to the phase of said frequency doubler output signal, a dual channel amplifier having a respective one of said direct current signals impressed on the respective inputs of said dual channels, means for imposing a direct current bias on each of said channels of such magnitude as to just bring each of said channels into the region of cutoff, means for generating a triangular waveform having truncated base apexes, means for superposing said triangular waveform on said direct current bias with the truncated bases at the level of the direct current bias and the remainder of the triangular waveform extending in a direction such as to drive said channels further into their cutoff region, a split series field motor having opposite ends of its split field connected to respective outputs of said dual channels, a rudder actuated by said motor, and negative feedback means actuated in accordance with said rudder deflection applying a feedback signal to said earth inductor compass which is proportional to the deflection of said rudder.

14. An autopilot as set forth in claim 13 in which the means for generating the truncated triangular waveform is energized by an output of said oscillator.

15. An autopilot comprising, an oscillator generating an output having a preselected frequency, an earth inductor compass excited thereby and emitting a steering error signal having double said preselected frequency, a frequency doubler having an output of said oscillator imposed thereon, a synchronous demodulator having the output of said frequency doubler and said steering error signal impressed thereon and producing therefrom a pair of direct current signals of opposite senses the magnitudes of which depend on the magnitude of said steering error signal and the senses of which depend on the phase of said steering error signal relative to the phase of said frequency doubler output, a dual channel amplifier having a respective one of said direct current signals impressed on the respective inputs of said dual channels, each of said channels being composed of a plurality of stages, means for imposing a direct current bias on each of the stages of such a magnitude as to render each stage nonconductive, the magnitude of the direct current bias applied to the first stage of each channel being such as to just bring said first stages into the region of cutoff, positive feedback means for each of said channels whereby a signal of sufficient strength to overcome the bias of a first stage renders the associated channel fully conductive, means for generating a triangular waveform, means for superposing said triangular waveform on the direct current biases of each of the first stages of said dual channel amplifier in such a direction as to drive said first stages further into their cutoff region, a motor connected to the outputs of each of said amplifier channels and so energized thereby that signal output from one channel drives said motor in one direction whereas signal output produced by the other channel drives said motor in the opposite direction, a rudder actuated by said motor, and negative feedback means actuated in accordance with said rudder deflection applying a feedback signal to said earth inductor compass which is proportional to the deflection of said rudder.

16. An autopilot as set forth in claim 15 in which the means for generating the triangular waveform is energized by an output of said oscillator.

17. An autopilot comprising, an oscillator generating an output having a preselected frequency, an earth inductor compass excited thereby and emitting a steering error signal having double said preselected frequency, a frequency doubler having an output of said oscillator imposed thereon, a synchronous demodulator having the output of said frequency doubler and said steering error signal impressed thereon and producing therefrom a pair of direct current signals of opposite senses the magnitudes of which depend on the magnitude of said steering error signal and the senses of which depend on the phase of said steering error signal relative to the phase of said frequency doubler output, a dual channel amplifier having a respective one of said direct current signals impressed on the respective inputs of said dual channels, each of said channels being composed of a plurality of stages, means for imposing a direct current bias on each of the stages of such a magnitude as to render each stage nonconductive, the magnitude of the direct current bias applied to the first stage of each channel being such as to just bring said first stages into the region of cutoff, positive feedback means for each of said channels whereby a signal of sufficient strength to overcome the bias of a first stage renders the associated channel fully conductive, means for generating a triangular waveform having truncated base apexes, means for superposing said triangular waveform on the direct current biases of each of said first stages with the truncated bases at the level of the direct current bias and the remainder of the triangular waveform extending in a direction such as to drive said channels further into their cutoff region, a split series field motor having opposite ends of its split field connected to the respective outputs of said dual channels, a rudder actuated by said motor, and negative feedback means actuated in accordance with said rudder deflection applying a feedback signal to said earth inductor compass which is proportional to the deflection of said rudder.

18. An autopilot as set forth in claim 17 in which the means for generating the truncated triangular waveform is energized by an output of said oscillator.

References Cited by the Examiner
UNITED STATES PATENTS

| | | | |
|---|---|---|---|
| 2,403,669 | 7/46 | Martin et al. | 33—204 |
| 2,633,559 | 3/53 | Perkins et al. | 33—204 |
| 2,778,982 | 1/57 | Loeffler | 318—257 |
| 2,883,613 | 4/59 | Van Winkle | 318—30 |

ORIS L. RADER, *Primary Examiner.*